May 5, 1970 G. A. WILLIAMSON 3,510,597

FREQUENCY BANDWIDTH COMPRESSION AND EXPANSION SYSTEM

Original Filed April 27, 1964 3 Sheets-Sheet 1

INVENTOR.
GLEN A. WILLIAMSON

BY Kimmel & Crowell

ATTORNEYS.

FREQUENCY BANDWIDTH COMPRESSION AND EXPANSION SYSTEM

Original Filed April 27, 1964 3 Sheets-Sheet 2

INVENTOR.
GLEN A. WILLIAMSON
BY Kimmel & Crowell
ATTORNEYS.

FREQUENCY BANDWIDTH COMPRESSION AND EXPANSION SYSTEM
Original Filed April 27, 1964
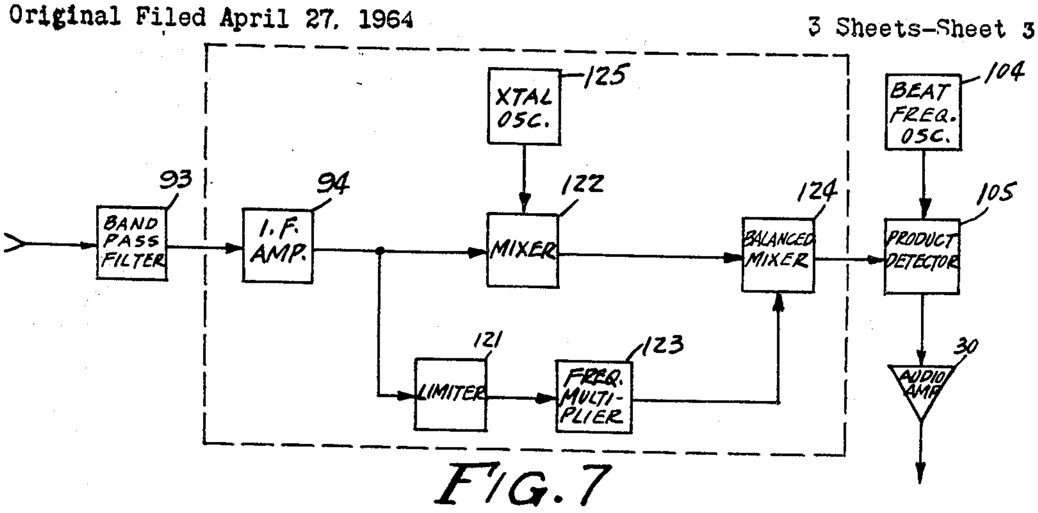
FIG. 7
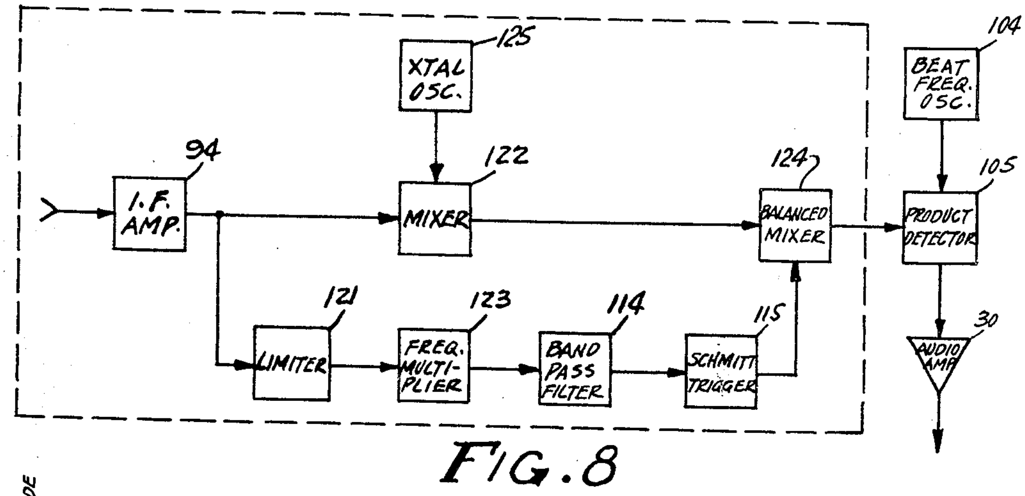
FIG. 8
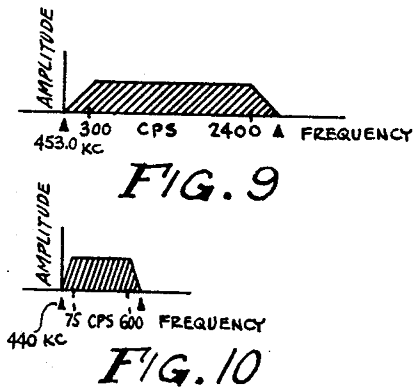
FIG. 9, FIG. 10
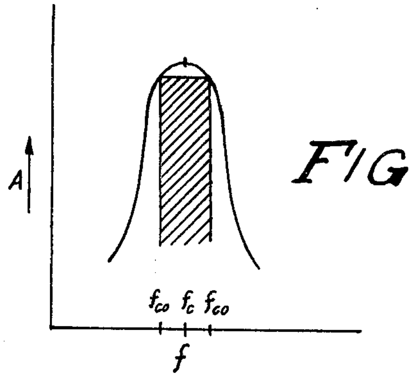
FIG. 13
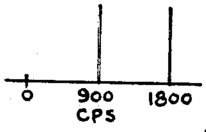
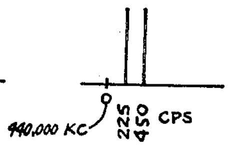
FIG. 11 FIG. 12
INVENTOR.
GLEN A. WILLIAMSON
BY
Kimmel & Crowell
ATTORNEYS.

United States Patent Office

3,510,597
Patented May 5, 1970

3,510,597
FREQUENCY BANDWIDTH COMPRESSION AND EXPANSION SYSTEM

Glen A. Williamson, 339 Norwood Drive, Danville, Va. 24541

Continuation of application Ser. No. 362,777, Apr. 27, 1964. This application May 5, 1969, Ser. No. 824,364
Int. Cl. H04b 1/68
U.S. Cl. 179—15.55 11 Claims

ABSTRACT OF THE DISCLOSURE

A transmitter and receiver system in which an audio signal modulates a radio frequency signal which modulated signal is filtered to produce a single sideband having a given frequency bandwidth, the single sideband width is compressed by heterodyning said signal with a submultiple of said signal and the compressed bandwidth single sideband derived therefrom is transmitted to a receiver. The receiver expands the single sideband bandwidth to the original bandwidth by heterodyning said signal with a higher frequency signal and heterodyning said higher frequency signal with a signal derived from the input to the receiver. This system permits tarnsmission of a single sideband signal having a bandwidth a fraction, e.g. ¼ of the bandwidth of the original modulating signal.

This application is a continuation of my earlier application Ser. No. 362,777, filed Apr. 27, 1964, now abandoned.

The present invention relates generally to frequency bandwidth compression systems and more particularly to a system wherein single sideband spectra are frequency compressed and expanded by heterodyning two single sideband waves.

With ever increasing crowding of the radio frequency transmission spectrum, the need for signal bandwidth reduction becomes very acute. Successful bandwidth reduction cannot, of course, be accompanied with substantial information loss. One of the straight forward approaches to the problem, frequency dividing the original information, has not met wide acceptance because frequency division of the information spectrum is usually accomplished with non-linear devices that eliminate all amplitude information. Numerous approaches relying on mathematical analysis have also been taken. These systems usually result in very complex design procedures and are adaptable for a singular use.

Another solution to the bandwidth reduction problem is advanced in U.S. Pat. 2,874,222, wherein a single sideband wave containing the desired information spectra is derived prior to bandwith reduction. This wave is demodulated in one channel and the information spectrum is frequency compressed in another channel. The demodulated and compressed waves are heterodyned to derive a further single sideband signal having the original spectrum in a compressed band. This system causes considerable amplitude information to be lot because of the requirements for a low pass filter having a 300 cycle per second cut-off frequency that follows the amplitude detector. Such a filter of course removes considerable amplitude information from the spectrum of interest. Also, the filter causes considerable phase shift in the relative phases of the heterodyned signal, further precluding the derivation of a single sideband wave having the correct amplitude information.. The frequency expander of said prior patent is beset by similar problems because it includes a low pass filter with a 300 cycle cut-off responsive to an amplitude detector output.

I have found satisfactory band compression and subsequent expansion of an information spectra are obtained with a heterodyning operation responsive solely to single sideband signals.

In band compression, operation at a transmitter, the single sideband information spectrum is compressed by a predetermined frequency to derive a rectanuglar wave having constant positive and negative amplitude levels. This wave is amplitude modulated with the original single side band spectrum so that substantially all of the original amplitude information is retained in the compressed band. The rectangular wave may be derived with a series of cascaded binary frequency dividers (each divides frequency by two) or a single frequency divided. In the former case, the output of each binary stage is applied to one of several cascaded mixers, the first of which is responsive to the original single sideband spectrum. In the second embodiment, the divider output is heterodyned twice with the original single sideband spectra; one heterodning operation deriving a summation frequency sideband and the other a differency frequency sideband.

In the recevier, where the compressed single sideband wave is expanded so that it is a substantial replica of the original information, the received wave is divided into two channels. In one channel, a wave having the same frequency components as the received information spectrum is derived. In the other channel, the sideband of the information spectrum is shifted in frequency relative to the information in the first channel. Signals in the two channels are mixed together to derive the expanded sideband spectrum. According to one embodiment successive mixing operations by the use of cascaded mixers are accomplished to attain information band expansion, as desired. In another embodiment, one channel includes a frequency multiplier, the output of which is heterodyned with the single sideband, compressed signal in the other channel.

A feature of the present invention, according to certain modifications thereof, resides in providing the receiver with almost perfect selectivity, i.e., with a filter that excludes all frequencies outside of a predetermined band, and passes all frequencies within that band with substantially the same amplitude. This is accomplished by providing one receiver channel with an amplitude limiter for deriving rectangular waves of invariable positive and negative amplitudes. The rectangular waves are applied to a filter or frequency discriminator that generates a variable amplitude output related to the limiter output frequency. If the variable amplitude exceeds a predetermined level, indicative of the wave being within the band of interest, a voltage responsive wave generator, e.g., a Schmitt trigger, generates a rectangular wave that follows the limiter output waveshape. When the limiter output frequency is outside the desired band, the trigger is not activated and derives a constant amplitude output, which when mixed with the signal in the other channel, produces a wave that is completely attenuated by filters in the system.

It is, accordingly, an object of the present invention to provide a new and improved system for transmitting reduced bandwidth information.

Another object is to provide a new and improved single sideband compression transmission system wherein a substantial portion of the amplitude information within the information spectrum is retained.

A further object is to provide a single sideband bandwidth compression transmission system wherein compression and expansion are accomplished solely by frequency multiplication, division and heterodyning so that substantial amplitude information over the entire band is retained.

An additional object of the invention is to provide a receiver with almost perfect selectivity for single sideband compressed bandwidth signals.

The above and still further objects, features and advantages of the present invention will become apparent upon consideration of the following detailed description of one specific embodiment thereof, especially when taken in conjunction with the accompanying drawings, wherein:

FIG. 7 is a block diagram of another receiver embodiment wherein band expansion is accomplished with a frequency multiplier;

FIG. 8 is a modification of FIG. 7 wherein a filter of virtually infinite selectivity is provided; and FIGS. 9–13 are curves to aid in understanding the present invention.

Figure 1:
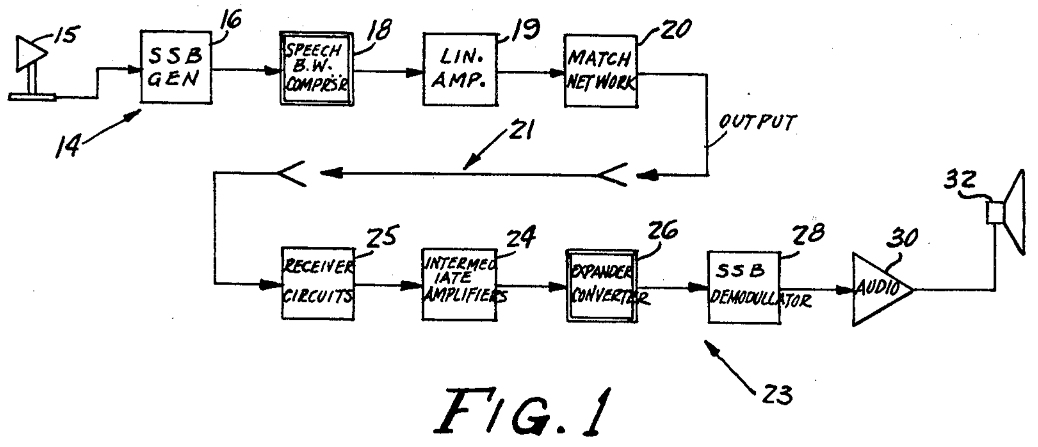
FIG. 1 PRIOR ART
FIG. 1 is a block diagram of a complete transmission and receiver system in which the principles of the invention are applicable.

Reference is now made to FIG. 1 of the drawings, wherein there is illustrated in block diagram form an entire system of the type in which the present invention is utilized. Transmitter 14 includes a source of information signals, typically microphone 15 for transducing speech signals in the spectrum 300 to 2400 c.p.s. into electric waves. The signal deriving from microphone 15 is coupled to single sideband generator 16, of conventional type, that produces a single sideband, class A radio frequency signal modulated by the speech waves; in an exemplary instance the spectrum deriving from generator 16 fluctuates between 453.3 and 455.4 kc., (indicated in the amplitude vs. frequency plot of FIG. 9 by the line parallel to the frequency axis) corresponding with the 0.3 to 2.4 kc. modulation of source 15.

The modulation components deriving from generator 16 are frequency compressed in bandwidth compressor 18, one of the essential parts of the present invention. Compressor 18 is arranged to frequency divide the sideband spectrum by a predetermined amount, e.g. 4; in the exemplary instance the compressor output is a single sideband spectrum extending between 440.075 and 440.600, indicated in the amplitude vs. frequency plot of FIG. 10 by the line parallel to the frequency axis. While no carrier waves are derived from compressor 18, the compressor may be considered as having an "absent" carrier at 440 kc. The amplitudes of waves deriving from compressor 18 are a substantial replica of the compressor input for the corresponding frequencies divided by the appropriate factor.

Linear amplifier 19 increases the power level of the single sideband waves deriving from compressor, without substantial distortion. The output of amplifier 19 is coupled to any suitable transmission medium 21, radio or wire, e.g., via impedance matching and frequency translating network 20.

The manner by which transmitter 14 functions to frequency compresses the audio signal deriving from microphone 15 can be realized with the aid of FIGS. 11 and 12, amplitude vs. frequency plots of outputs deriving from micrphone 15 and compressor 18. Microphone signals of frequencies 900 and 1800 c.p.s., having equal amplitudes are translated into equal amplitude sideband waves of frequencies 440.225 and 440.450 kc., respectively. Thus, the 900 c.p.s. input signal spread is reduced in frequency by one quarter to 225 c.p.s. and the transmission system bandwidth is only one quarter the spectra of source 15.

At receiver 23, the received single sideband wave containing the frequency compressed information is applied to I.F. amplifier 24 via tuned receiver circuit 25. Circuit 25 is tuned to the "absent" carrier deriving from transmitter 14 so that the output of I.F. amplifier 24 is a single sideband spectrum corresponding exactly in amplitude and frequency with the output of compressor 18, i.e., the output of the I.F. amplifier extends between 440.075 and 440.600 kc.

The sideband components deriving from I.F. amplifier 24 are frequency multiplied in expander converter 26, another essential segment of the present invention. Converter 26 is arranged to frequency multiply, while preserving amplitude information, the sideband spectra by the same factor as the division factor introduced by compressor 18. Thus, the output of expander is a single sideband spectra extending between 240.7 and 238.6 kc. and has an "absent" carrier of 241 kc. The 240.7 and 238.6 kc. waves correspond with information frequencies of 300 and 2400 c.p.s., respectively, so that information deriving from expander 26 has the same bandwidth and approximate waveshape as the input to compressor 18.

The output of expander 26 is applied to single sideband demodulator 28, of conventional design, that applies an audio wave spectra of 300 to 2400 c.p.s. to audio amplifier 30. Amplifier 30 drives speaker 32 which produces signal replicas of the input to microphone 15.

Figure 2:
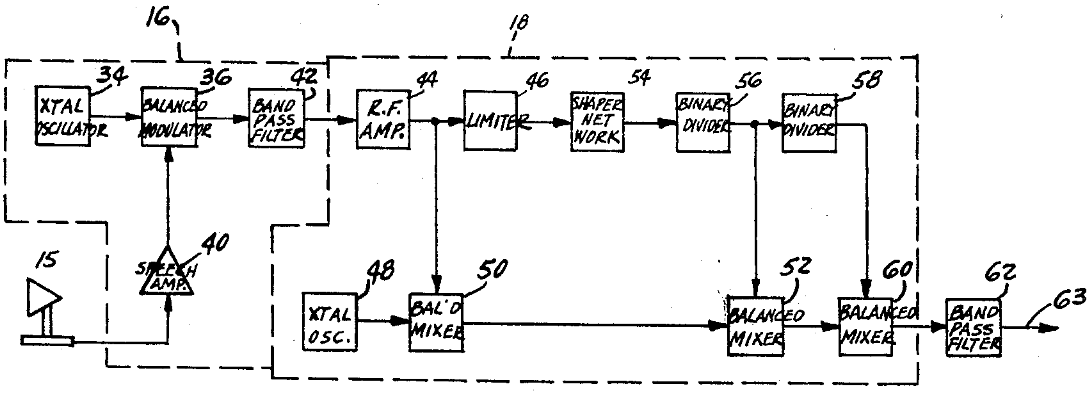
FIG. 2 is a block diagram of one embodiment of the transmitter wherein band compression is accomplished through successive frequency division and mixing operations.

Reference is now made to FIG. 2, a block diagram of one preferred embodiment of a portion of transmitter 14. The signal deriving from microphone 15 is applied to audio amplifier 40, the output of which is mixed in balanced mixer 36 with the 453.000 kc. carrier generated by crystal oscillator 34. Mixer 36 produces the upper and lower sidebands extending in frequency between 453.300 and 455.400 kc. and between 452.700 and 450.600 kc. respectively, but no carrier frequency because of its balance nature. The output of modulator 36 is applied to band pass filter 42 that passes one of the sidebands to the exclusion of the other, in the exemplary case the upper sideband.

The single sideband signal deriving from generator 16 is linearly amplified in R.F. amplifier 44, from which it is applied in parallel to amplitude limiter 46 and balanced mixer 50. Mixer 50 is responsive to the 326.75 kc. wave deriving from crystal oscillator 48 and is provided with a filter so its output includes only the upper sidebands of its input, a spectra between 780.05 and 782.15 kc.

Limiter 46 generates a series of constant amplitude positive and negative rectangular waves having axis crossings corresponding exactly in time with the axis crossings of its input, i.e., whenever the input to limiter 46 is of zero value, its output is in a transitional period between the positive and negative values. The rectangular waves are applied to shaper 54 that produces a pulse output each time the limiter output goes from positive to negative. Thereby, shaper 54 generates a pulse, at a precise time, once during every cycle of the R.F. input to the compressor 18. The time of occurrence and exact frequency of these pulses are, of course, determined by the frequency of source 15. The pulses deriving from network 54 and applied to a pair of binary frequency dividers 56 and 58, each of which may be bistable or Eccles Jordon flip flops. Flip flops 56 and 58 generate rectangular wave outputs that are respectively one half from one quarter the frequency of the output pulses generated by shaper 54. The leading edges of each wave deriving from flip flops 56 and 58 are synchronized exactly with every second and fourth shaper pulse to maintain proper phase relations between the various waves.

The 226.650 to 227.70 kc. rectangular waves deriving from divider or flip flop 56 are mixed in balanced mixer 52 with the sinusoidal, amplitude modulated output of mixer 50. From mixer 52, there is derived the difference frequency of its mixing operation, an amplitude modulated, single sideband sinusoid having a spectrum extending between 553.400 and 554.450 kc. Thus, the output of mixer 52 can be considered as the upper sideband of an "absent" carrier having a frequency of 553.25 kc., wherein all the frequency information of source 15 is compressed into a spectrum only 1050 c.p.s. wide. Because the inputs to mixer 52 have not undergone any non-linearities that cause phase changes, the amplitudes of its output reflects the amplitude distribution of the original audio signal.

The single sideband output of mixer 52 is combined with the output of flip flop 58 in balanced mixer 60 that derives single sideband difference frequency signals. The signals deriving from mixer 60, covering a spectrum from 440.075 to 440.600, may be considered as the upper sideband of 440.000 kc. carrier. The output of mixer 60 is a further frequency compression of the original speech signal with all of the original amplitude information retained for the same reason mentioned supra regarding the output of mixer 52. From mixer 60, the compressed R.F. signal passes through bandpass filter 62, designed to completely attenuate any signals outside the band of interest prior to transmission.

Figure 3:
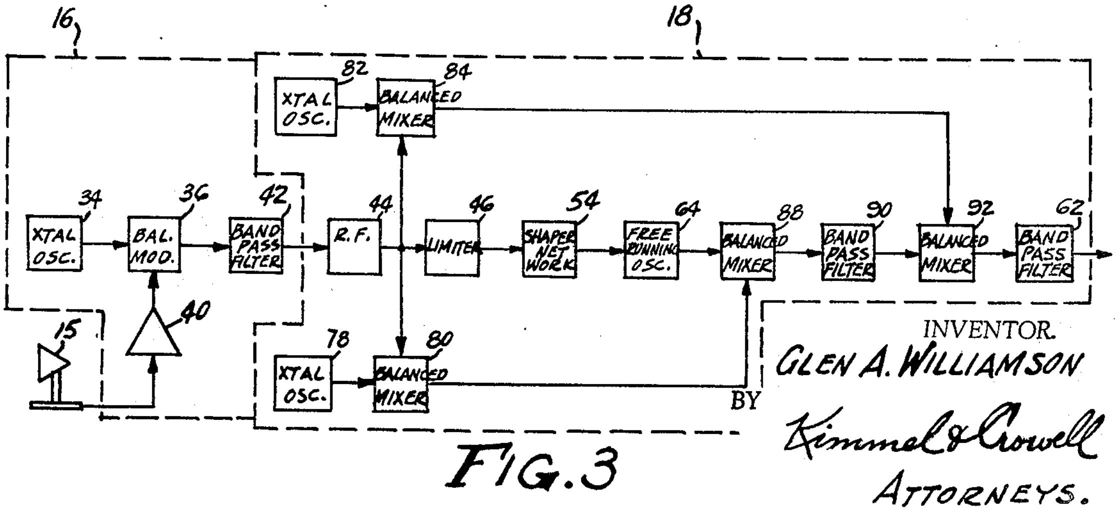
FIG. 3 is a block diagram of another transmitter embodiment wherein band compression is accomplished with a free running, triggered oscillator.

Reference is now made to FIG. 3 of the drawings, wherein there is disclosed a further embodiment of compressor 18. Again, a single sideband signal spectrum extending between 453.3 and 455.4 kc. is applied by R.F. amplifier 44 to cascaded limiter 46 and shaper 54; the latter generating pulses corresponding with alternate frequency crossings of the R.F. amplifer output. The pulses deriving from shaper 54 control free running oscillator 64, preferably an astable multivibrator having a frequency slightly less than the selected frequency division; in the example, the division factor is four and the oscillator frequency is selected as 110 kc. Thus, oscillator 64 is arranged to be triggered by only every fourth positive going output pulse from shaper 54 and produces constant amplitude positive and negative rectangular waves. The leading and trailing edges of these waves, having a frequency equal to one fourth the R.F. output of amplifier 44, are synchronized with the positive going axis crossings of the R.F. signal.

The single sideband output of frequency divider 64 is translated to a higher frequency in balanced mixer 88. Mixer 88 is responsive to the upper sideband deriving from the mixing action, by balanced mixer 80, of the outputs of 186.000 kc. crystal oscillator 78 and amplifier 44. Mixer 88 selects the sumfrequencies of its inputs to detween 752.625 and 755.250 kc. The single sideband spectrum deriving from mixer 88 is passed through bandpass filter 90 to balanced mixer 92 where the signal frequencies added in the first mixer are subtracted to derive an AM single sideband signal with a spectrum extending between 440.075 and 440.600 kc.

Subtraction of the derived signal frequencies is accomplished by difference mixing the output of R.F. amplifier 44 with the 140.750 kc. carrier deriving from crystal oscillator 82 in balanced mixer 84. The resulting 312.550 to 314.650 spectrum deriving from modulator 84 in frequency substracted from the output of filter 90 to produce the desired result.

While the circuit of FIG. 3 utilizes fewer components than that of FIG. 2, in not requiring multiple flip flop divider stages, its operation is not as accurate as the latter unless special precautions are taken. If filter 90 and some very careful shielding techniques are not utilized, spurious signals within the desired bandpass are coupled to mixer 92, hence introduce errors in the compressed wave.

Figure 4:
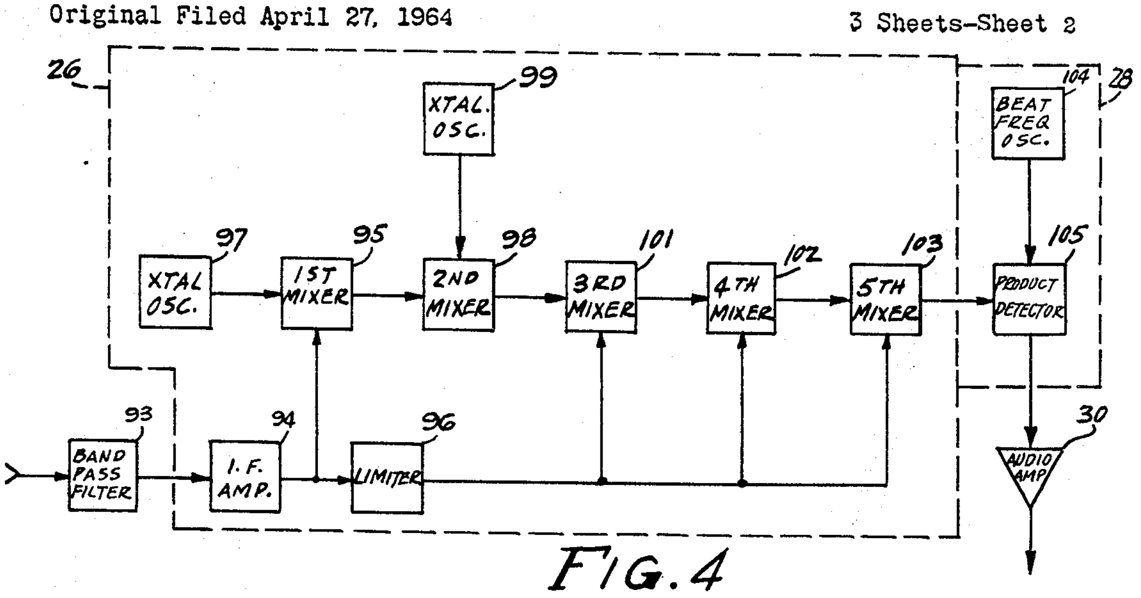
FIG. 4 is a block diagram of a receiver embodiment wherein band expansion is accomplished by multiple, cascaded mixing operations.

Reference is now made to FIG. 4, one preferred embodiment of a segment of receiver 23. The upper sideband compressed amplitude modulated sinusoidal spectrum, between 440.075 and 440.600 kc., is coupled through cascaded bandpass filter 93 and I.F. amplifier 94. From amplifier 94, the spectrum is applied in parallel to balanced mixer 95 and amplitude limiter 96. Limiter 96 converts its sinusoidal input into a series of constant amplitude positive and negative rectangular waves, having axis crossings synchronized with those of the signal deriving from amplifier 94.

The upper sideband deriving from amplifier 94 is translated to a lower carrier frequency, upper sideband by difference mixing with the 100 kc. output of crystal oscillator 97 in balanced mixer 95. Thereby, the 4400.075 and 440.600 kc. frequencies are converted into frequencies of 340.075 and 340.600 kc., respectively. The upper sideband spectrum is reversed to a lower sideband and translated to a higher carrier frequency in balanced, difference frequency mixer 98 that is responsive to the 1901 kc. waves deriving from crystal oscillator 99. Thus, the output of mixer 98 comprises a lower sideband wave form with an "absent" carrier of 1561 kc. and bandwidth between 1560.925 and 1560.400 kc. It is noted that the upper sideband output of amplifier 94 is first translated in carrier frequency by mixer 95 and then the sideband direction is reversed instead of being translated and converted in one step. This is done to avoid mixing with a high frequency the effects of limiter 96 on the reversed sideband energy deriving from mixer 98. If the frequency translation is not utilized, the output of limiter 96 is of the same frequency as the one input to mixer 98 and coupling of spurious energy from the limiter to mixer 98 occurs.

The lower sideband spectrum deriving from mixer 98 is applied to cascaded balanced mixers 101–103, each of which is responsive to the rectangular wave output of limiter 96 and is designed to derive the difference frequency of its inputs. Thus, each of mixers 101–103 generates a lower sideband, sinusoidal wave having a bandwidth that is an integral multiple of the compressed band, i.e., the spectrum derivings: from mixer 101 extends between 1120.850 and 1119.800 kc. (bandwidth 1050 c.p.s.), and from mixer 102 extends between 680.775 and 679.200 kc. (bandwidth 1575 c.p.s.), and from mixer 103 extends between 240.7 and 238.6 kc. (bandwidth 2100 c.p.s.). The output deriving from mixer 103 is thus an amplitude modulated lower sideband having substantially the same frequency content as the upper sideband applied to compressor 18. Its amplitude content is very nearly that of the original uncompressed signal because relative phase relations have been properly maintained in every operation.

The expanded sideband spectra deriving from mixer 103 is beat with the 241 kc. output of crystal oscillator 104 and converted into an audio signal by product detector 105. The resulting audio spectrum, extending between 300 and 2400 c.p.s., is a substantial replica of source 15 and drives audio amplifier 30 to produce the original voice signal.

While the expander described is directed to an apparatus wherein frequency multiplication is attained by deriving the difference frequency of the upper and lower sidebands, the same principles are applicable with a system wherein the sum frequencies of the sidebands having the same direction are considered. Consider the case when the output of limiter 96 is again an upper sideband spectrum between 440.075 and 440.600 kc. and the signal deriving from mixer 98 is an upper sideband spectra between 200.075 and 200.600 kc. with an "absent" carrier of 200.000 kc. Each of mixers 101–103 under such a circumstance produces an upper single sideband responsive to the sum of its input frequencies, i.e., the output of mixer 101 is a spectrum extending between 64.150 and 641.200 kc. (a bandwidth of 1050 c.p.s.), the output of mixer 102 is a spectrum between 1080.225 and 1081.800 kc., (a bandwidth of 1575 c.p.s.) and the output of mixer 103 is a spectrum between 1520.300 and 1522.400 kc. (a bandwidth of 2100 c.p.s.). The frequency of oscillator 104 is adjusted to be 1520.000 kc. so that the output of detector is the audio spectrum between 300 and 2400 c.p.s. While the described modification of FIG. 4 theoretically functions identically with the originally described embodiment, practically it is not as satisfactory. This is because of difficulties encountered in filtering one sideband from the other at the relatively high frequencies encountered.

While FIG. 4 has been described in conjunction with expanding the sideband by a factor of four, it is to be understood that any approprate multiplication factor can be introduced. The number of cascaded mixers wherein the amplitude limited wave is mixed with the single sideband signal is always selected to be one less than the desired expansion factor.

Figure 5:
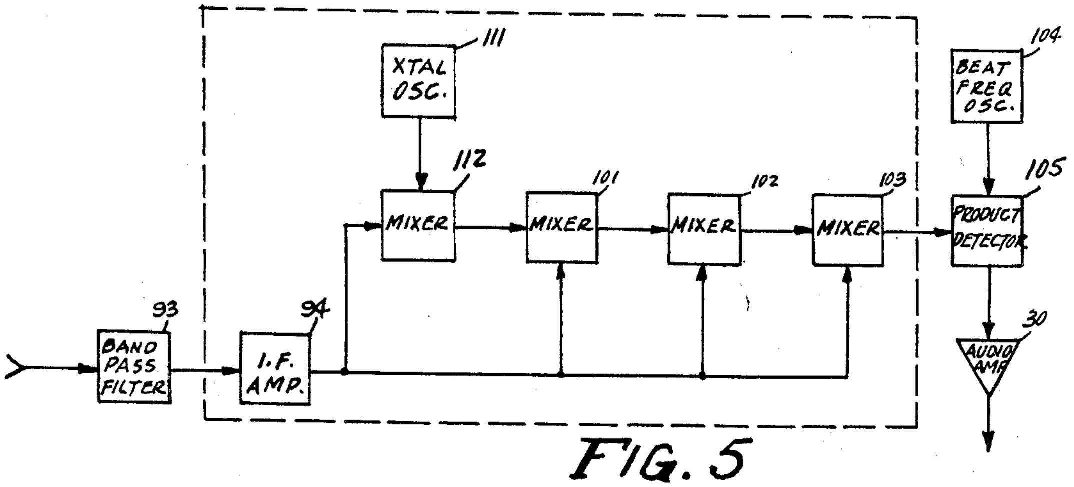
FIG. 5 is a modification of FIG. 4, wherein frequency expansion is accompanied with amplitude expansion.

Reference is now made to FIG. 5 of the drawings, a modification of FIG. 4, wherein amplitude limiter 96 is removed and 2001 kc. crystal oscillator 111 as well as balanced, difference frequency mixer 112 are substituted for oscillators 97, 99 and mixers 95, 98. In consequence, both inputs to mixers 101–103 are sinusoidal waves and the output of the last mixer is an accurate representation of the frequency components applied to compresor 18.

The amplitudes of the spectrum deriving from mixer 103 is not accurately related to the wave deriving from transmitter 14 because each of mixers 101–103 sums the amplitudes of the envelopes applied thereto. In FIG. 5, this summation is a factor in the resultant output because of the sinusoidal nature of both inputs to modulators 101–103, in conradistinction to the voltage limited amplitude inputs to the mixer of FIG. 4.

Thus, the output of mixer 103, FIG. 5, is amplitude expanded by +12 db relative to the output of amplifier 94 because like envelopes are mixed together three times, once in each of mixers 101–103. Amplitude expansion is important and should be employed if the single sideband signal deriving from transmitter compressor 18 is both clipped and compressed in amplitude. Such expansion restores the original amplitude components without loss of intelligence. Of course, amplitude clipping and compressing are necessary when signals of high average power are transmitted.

Figure 6:
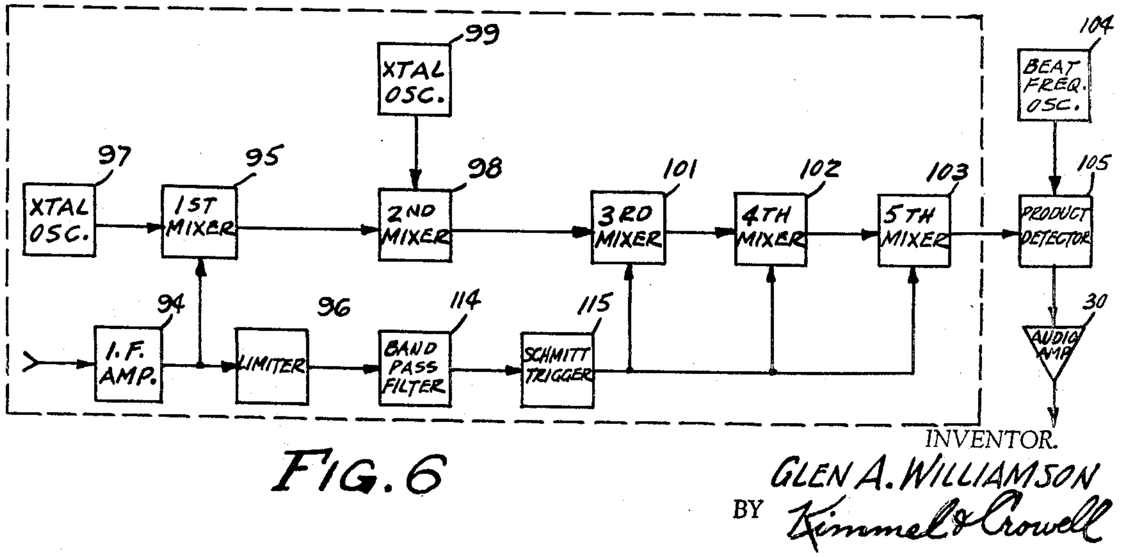
FIG. 6 is a modification of FIG. 4, wherein a filter of virtually infinite selectivity is provided.

Reference is now made to FIG. 6 of the drawings, wherein the circuit of FIG. 4 is modified to include bandpass filter 114 and Schmitt trigger 115, both of which are cascaded with the limiter 96. Filter 114 is arranged to have its center frequency coincident with the center frequency of the desired spectrum deriving from limiter 96, as indicated at $f_c$ by the frequency vs. amplitude curve, of the filter response, of FIG. 13. In the present system, assuming the frequencies mentioned supra regarding FIG. 4, $f_c$=440.000 kc. and $f_{co}$ are 440.075 and 440.600 kc. for the lower and upper frequency limits. Schmitt trigger 115 is designed to produce a positive voltage of reference amplitude whenever its input amplitude exceeds the amplitude commensurate with frequency $f_{co}$, the upper sideband limit of the compressed spectrum; see FIG. 13.

Thus, filter 114 functions as a frequency discriminator to supply input signals to voltage responsive trigger 115. Whenever the frequency applied to trigger 115 is greater than $f_{co}$, the trigger derives a constant amplitude, negative output signal that provides no information regarding the frequency of the output from limiter 96. For frequencies between $f_c$ and $f_{co}$, Schmitt trigger 115 generates rectangular waves that follow the axis crossings deriving from limiter 96. Thereby, filter 114 and trigger 115 together function as a highly selective filter having skirts of virtually infinite slope, as shown by the shaded area of FIG. 13. Because it is possible to adjust the bandwidth of the infinite filter comprising elements 96, 114 and 115 to within a few cycles per second, information outside the band of interest can be completely eliminated. In a frequency compression and expansion system of the present type, this is sometimes necessary to provide the desired fidelity in reproduction.

Reference is now made to FIG. 7, a block diagram of another receiver, expander embodiment. In this embodiment, the output of I.F. amplifier 94 is applied in parallel to limiter 121 and balanced mixer 122. Limiter 121 supplies a series of constant amplitude rectangular waves to frequency multiplier 123, which waves switch between their positive and negative values in synchronism with the axis crossings deriving from amplifier 94.

Frequency multiplier 123 generates a constant amplitude output harmonically related to its input. The multiplication factor is selected as being either one less or one greater than the desired expansion factor. To determine which multiplication is utilized, it is necessary to consider whether the output of balanced mixer 124 is the sum or difference frequency of its inputs. The other input to mixer 124 is a single sideband spectrum deriving fiom mixer 122 which is reversed in direction relative to the original single sideband.

In a typical embodiment, the 440.075 to 440.600 kc. upper sideband output of amplifier 94 is translated and reversed to a lower sideband in difference frequency deriving balanced mixer 122, that is also responsive to the 1519 kc. carrier deriving from crystal oscillator 125. Thereby, the output of mixer 122 is a lower sideband spectrum having an "absent" carrier of 1079.000 kc. and extending between 1078.925 and 1078.400 kc. The multiplication factor of frequency multiplier 123 is selected as three so the spectrum deriving from it is an upper sideband extending between 1320.225 and 1321.800 kc. on an "absent" carrier of 1320.000 kc. In response to the waves applied to it, mixer 124 generates a fully expanded upper sideband extending between 241.300 and 243.400 kc. As in the previous embodiments, this sideband is heterodyned with 241 kc. output of oscillator 104 to derive the audio signal.

If multiplier 123 is selected to have a factor of five, mixer 124 is designed so it generates an output responsive to the sum of its input frequencies. In such an instance, the upper sideband spectrum deriving from multiplier 123 extends between 2200.375 and 2203.000 kc., on an absent carrier of 2200.000 kc. This spectrum is sum mixed in heterodyner 124 with that generated by mixer 122 to derive an upper sideband extending between 3279.300 and 3281.400 kc. The outputs of mixer 124 and oscillator 104, which is adjusted to generate a 3279.000 kc. carrier, are beat in detector 105 to produce the audio signal.

FIG. 8 is a modification of FIG. 7 wherein the virtually infinite selectivity of FIG. 6 is obtained by cascading bandpass filter 114 and Schmitt trigger 115 with the output of frequency multiplier 123. The advantages described supra, for FIG. 6, reside in the FIG. 8 modification.

In considering the operation of the above-described system for transmission and reception of speech, it should be recalled that, as is well-known in the art, speech waves contain both *energetic* and *phonetic* components. The phonetic component can be described as a quasi-steady-state spectral process which at any time can be described by a frequency spectrum whose lowest frequency can be about 80 Hz. This spectrum varies at a slower rate, somewhere between 25 and 50 Hz. This spectrum though complex is none the less a periodic wave (except for totally unvoiced sound). It is characteristic of a periodic wave, no matter how complex, that, after a certain time interval known as the *period*, its form is a repetition of what has gone before. In the case of an exactly periodic wave the repetition is exact. In the case of a nearly periodic wave (and syllabic rates in speech are so slow compared with voice frequencies of interest that every voiced speech wave is periodic or nearly periodic) the repetition is inexact and approximate, but nevertheless easily recognizable. This period is a measure of the pitch of the voiced sound, period and pitch being reciprocal.

When, in the use of the present invention, this speech wave is translated to a single sideband suppressed carrier signal and then limited in amplitude such that all effective amplitude information is removed, there results a rectangular wave having a zero axis crossing frequency, that when normalized, represents the period or pitch of the original speech input. This rectangular wave (limited single sideband wave) can be described as a varying CW wave whose instantaneous frequency represents the pitch of the speech input wave.

In the following explanation of the operation of the apparatus of FIGS. 2 and 4, simple equations are used wherein:

$f_c$—represents the suppressed carrier derived from oscillator 34.

$\Delta f$—represents the frequency deviation resulting from modulation by the pitch component of speech input.

$a(t)$—represents the amplitude component resulting from modulation by speech wave.

$f_1$—represents the heterodyne signal.

Referring now to FIG. 2, the speech input is applied to speech amplifier 40 from which the amplified speech wave is applied to balanced mixer 36 where it modulates carrier $f_c$ (453.000 kHz.) to provide a double sideband suppressed carrier modulated wave which may be represented as $a(t)(f_c+\Delta f)$ for the upper sideband and $a(t)(f_c-\Delta f)$ for the lower sideband. As is well known in the art, either the upper or lower sideband may be chosen, but for illustration purposes, the upper sideband $a(t)(f_c+\Delta f)$ is selected by passing it through bandpass filter 42 such that the spectrum fed to R.F. amplifier 44 includes all frequencies from 453.300 kHz. to 455.400 kHz. corresponding to the speech frequencies of interest, 300 Hz. to 2400 Hz., as referred to in connection with FIG. 9, all other frequencies being rejected by the action of bandpass filter 42. ($f_c$ of 453.000 kHz. corresponds to zero Hz. or D.C.) The signal applied to the input of R.F. amplifier 44 being the output of single sideband generator 16 is said to be a single sideband suppressed carrier signal as is well known in the art and thus far has no unique properties. The output level being appropriate for such generators, R.F. amplifier 44 furnishes the required positive or negative gain as is necessary for the continuance of the signal through the system.

The output of R.F. amplifier 44 is split into two directions, which on the other hand is fed to amplitude limiter 46 which removes all effective amplitude information, $(f_c+\Delta f)$ leaving a constant amplitude signal whose zero axis crossing frequency when normalized represents the pitch component of the original speech input. The action of the limiter in selecting the *dominant* signal in a multiple signal spectrum is well known in the art, and is known as the "capture effect" (see . . . Baghdady, E.J. "Theory of Stronger-Signal Capture in F.M. Reception," Proc. IRE, vol. 46, pp. 728–738, April 1958). The output of limiter 46 is processed by shaper 54 deriving a pulse sufficient to reliably trigger binary divider 56 which produces one cycle at its output for every two cycles at its input thereby, deriving signal $\frac{1}{2}(f_c+\Delta f)$, 226.650 kHz. to 227.700 kHz. corresponding to the limited upper sideband after division by two; while 226.500 kHz. corresponds to the suppressed carrier $f_c$. Note that after division the $\Delta f$ component of binary divider 56 deviates in frequency one half the value of the original $\Delta f$, output of limiter 46.

The output of binary divider 56 is again divided by two by binary divider 58 producing signal $\frac{1}{4}(f_c+\Delta f)$ 113.325 kHz. to 113.850 kHz., corresponding to the limited upper sideband after division by four, 113.250 kHz. corresponds to the suppressed carrier $f_c$. The $\Delta f$ component binary divider 58 deviates in frequency one fourth the value of the original $\Delta f$, output of limiter 46.

The output of R.F. amplifier 44 on the other hand, is translated in balanced mixer 50 by heterodyning it with the 326.750 kHz. output of oscillator 48, $f_1$, to produce a translated output of $a(t)[f_c+\Delta f)+f_1]$ 780.050 kHz. to 782.150 kHz. corresponding to the selected upper sideband with suppressed carrier frequency of 779.750 kHz. This output is then heterodyned in mixer 52 with the output of binary divider 56, with the difference products being selected, $a(t)[\frac{1}{2}(f_c+\Delta f+f_1]$ which occupy a band from 553.400 kHz. to 554.450 kHz. and a suppressed carrier frequency of 553.250 kHz. The signal at this point can be described as a single sideband signal possessing the original amplitude information but occupying only one half the original bandwidth. This is due to the subtractive effect that the $\Delta f/2$ output of divider 56 has on the output of mixer 50 when heterodyned in mixer 52 such that $$a(t)[(f_c+\Delta f)+f_1]-\frac{1}{2}(f_c+\Delta f)=a(t)[\frac{1}{2}(f_c+\Delta f)+f_1]$$

By a similar mixing step, the output of mixer 52 and binary divider 58 are heterodyned in mixer 60. Again, the different products are selected: $a(t)[\frac{1}{4}(f_c+\Delta f)+f_1]$ which occupy a band from 440.075 kHz. to 440.600 kHz. and a suppressed carrier frequency of 440.000 kHz. Again, the signal at this point can be described as previously, but this time it occupies only one fourth the original bandwidth. From mixer 60 the signal is passed by bandpass filter 62 which attenuates any signal outside the band of interest prior to transmission.

If this signal were demodulated at this point, using conventional single sideband techniques, the audio spectrum yielded would duplicate the original speech input with respect to amplitude, but would have a scaled pitch component deviating in frequency only one fourth that of the original.

Referring now to the expander in FIG. 4, of which FIGS. 5 and 6 are variations, the compressed upper sideband suppressed carrier signal occupying 440.075 kHz. to 440.600 kHz.. and having a suppressed carrier frequency $f_c$ of 440.000 kHz. and for simplicity is designated: $a(t)\frac{1}{4}(f_c+\Delta f)$, is passed by bandpass filter 93 and amplified by I.F. amplifier 94. From amplifier 94 the signal is applied in parallel to balanced mixer 95 and amplitude limiter 96. Limiter 96 removes all effective amplitude information, furnishing zero axis crossing information in the form of a constant amplitude rectangular wave, $\frac{1}{4}(f_c+\Delta f)$. The upper sideband deriving from amplifier 94 is translated to a lower carrier frequency by difference mixing with $f_1$, the 100.000 kHz. output of crystal oscillator 97 in balanced mixer 95 producing an upper sideband signal $a(t)[\frac{1}{4}(f_c+\Delta f)-f_1]$ occupying 340.075 kHz. to 340.600 kHz. with a suppressed carrier $f_c$ of 340.000 kHz. Next, this upper sideband signal is reversed to a lower sideband signal and translated to a higher carrier frequency by difference mixing it with $f_2$, the 1901.000 kHz. output of oscillator 99 in mixer 98 thus deriving a lower sideband signal $$a(t)f_2- \frac{1}{4}(f_c+\Delta f)-f_1]$$

having an $f_c$ of 1561.000 kHz. and extending from 1560.925 kHz. to 1560.400 kHz. This spectrum is applied to cascaded balanced mixers 101–103, each of which is responsive to the rectangular wave output of limiter 96 $\frac{1}{4}(f_c+\Delta f)$ and is designed to derive the difference products of its inputs such that the product of each successive heterodyne is a spectrum which is made wider by an amount equal to the original input wave, i.e., $$1+1=2+1=3+1=4$$

Thus, mixer 101 derives a lower sideband signal:

$$a(t)\{f_2-[\tfrac{1}{4}(f_c+\Delta f)-f_1]-\tfrac{1}{4}(f_c+\Delta f)\}$$
$$=a(t)f_2-[\tfrac{1}{2}(_c+\Delta f)-f_1]$$

with an $f_c$ of 1121.000 kHz., and extending from 1120.850 kHz. to 1119.800 kHz. Mixer 102 responds simi'arly yielding a lower sideband signal: $a(t)f_2-[\tfrac{3}{4}(f_c+\Delta f)-f_1]$ with an $f_c$ of 681.000 kHz. and extending from 680.775 kHz. to 679.200 kHz. Thus far the signal is ¾ of the desired bandwidth. Finally, mixer 103 responds producing a lower sideband signal $a(t)f_2-[(f_c+\Delta f)-f_1]$ with an $f_c$ of 241.000 kHz. and extending from 240.700 kHz. to 238.600 kHz. With the original bandwidth restored, the signal is now demodulated in the conventional manner by the action of heat frequency oscillator 104 and product detector 105. The resulting audio spectrum, extending between 300 Hz. to 2400 Hz., is substantialy a replica of the original speech input to the compressor.

While I have described and illustrated one specific embodiment of my invention, it will be clear that variations of the details of construction which are specifically illustrated and described may be resorted to without departing from the true spirit and scope of the invention as defined in the appended claims. For example, the specific frequency values mentioned are merely exemplary since any suitable frequencies can be employed.

I claim:

1. A bandwidth compression system responsive to an input information spectrum comprising a transmitter, said transmitter including: means responsive to said input spectrum for deriving first single sideband wave having a bandwidth commensurate with said input spectrum, a first channel responsive to said first wave for dividing, by a predetermined factor, the frequency of said wave to derive a second single sideband wave, a second channel responsive to said first wave for translating the frequency of said first wave relative to said second wave, and means for mixing said second wave with said translated wave to derive a third single sideband wave having said input spectrum compressed into a bandwidth approximately equal to the bandwidth of said first wave divided by said factor; a receiver responsive to said third wave, said receiver including; a third and fourth channels responsive to said third wave, one of said third and fourth channels including means for varying the frequency of said third wave to derive a fourth single sideband wave having an information spectrum bandwidth greater than said third wave, and means for heterodyning the single sideband wave in the other channel with said fourth single sideband wave to derive a fifth single sideband wave having an information spectrum substantially equal to the bandwidth of said input spectrum, and single sideband demodulating means responsive to said fifth single sideband wave.

2. A bandwidth compression system responsive to a first single sideband wave having a predetermined information spectrum comprising a transmitter, said transmitter including; a first channel responsive to said first wave for dividing, by a predetermined factor, the frequency of said wave to derive a second single sideband wave, a second channel responsive to said first wave for translating the frequency of said first wave relative to said second wave, and means for mixing said second wave with said translated wave to derive a third single sideband wave having said input spectra compressed into a bandwidth approximately equal to the bandwidth of said first wave divided by said factor; a receiver responsive to said third wave, said receiver including; a third and fourth channels responsive to said third wave, one of said third and fourth channels including means for varying the frequency of said third wave to derive a fourth sideband wave having an information spectrum bandwidth greater than said third wave, and means for heterodyning the single sideband wave in the other channel with said fourth single sideband wave to derive a fifth single sideband wave having an information spectra substantially equal to the bandwidth of said input spectra.

3. In a bandwidth compression system wherein a transmitter derives a first single sideband wave having a predetermined information spectrum, the spectrum of said first wave being compressed in bandwidth relative to the bandwidth of an input information spectrum, a receiver responsive to said first wave, said receiver including; first and second channels responsive to said first wave, one of said channels including means for varying the frequency of said first wave to derive a second single sideband wave having an information spectrum bandwidth greater than said first wave, and means for heterodyning the single sideband wave in the other channel with said second single sideband wave to derive a third single sideband wave having an information spectra substantially equal to the bandwidth of said input spectra.

4. A bandwidth compression system responsive to a first single sideband wave having a predetermined input information spectrum comprising a transmitter, said transmitter including; a first channel responsive to said first wave for dividing, by a predetermined factor, the frequency of said wave to derive a second single sideband wave, a second channel responsive to said first wave for translating the frequency of said first wave relative to said second wave, and mixing means responsive to the second wave and said translated wave to derive a third single sideband wave having said input spectrum compressed into a bandwidth approximately equal to the bandwidth of said first wave divided by said factor.

5. The system of claim 4 further including amplitude limiting means for the input of said means for mixing.

6. The system of claim 4 wherein said first channel includes $n$ cascaded binary frequency dividers, and said second channel includes $n$ cascaded mixers, the $k$th one of said mixers being responsive to the output of the $k$th binary divider and the output of the $(k-1)$th mixer, where $k$ is any integer between one and $n$.

7. The system of claim 4 wherein said first channel includes further means for translating the frequency of said first wave, means for heterodyning the second wave with the output of said further means for translating to derive a fourth single sideband wave, and another means for heterodyning the output of said second channel with the output of said fourth wave translating means to derive said third wave.

8. The system of claim 7 wherein said channels include means for translating the frequencies of the inputs to said another heterodyning means so they have the same sideband directions.

9. A system for expanding the information bandwidth spectrum of a first single sideband wave while retaining the amplitude information of the spectrum comprising, means responsive to said first wave for deriving a second wave translated in frequency relative to said first wave, means for mixing said first and second waves to derive a third single sideband wave, said translating and mixing means shifting the relative frequencies of said first and second waves so that the information bandwidth spectrum of said third wave is an integral multiple of the information spectrum bandwidth of said first wave, and including means responsive to said first wave for deriving a signal varying in amplitude in accordance with frequency, said signal having the same sideband components as the wave applied to said variable amplitude signal deriving means, an amplitude responsive trigger responsive to the signal deriving from said last named means, and means coupling the output of said trigger to said means for mixing.

10. The system of claim 9 wherein the direction of the selected sideband of said second wave is opposite in the sense of upper and lower sidebands relative to the direction of the sideband of said first wave, and said means for mixing derives the third wave as the difference frequency of said first and second waves.

11. The system of claim 9 wherein the direction of the sideband of said second wave is the same in the sense of upper or lower sidebands as the direction of the sideband of said first wave, and said means for mixing derives the third wave as the sum frequency of said first and second waves.

References Cited

UNITED STATES PATENTS

| | | | |
|---|---|---|---|
| 2,416,791 | 3/1947 | Beverage. | |
| 2,735,001 | 2/1956 | Witters. | |
| 3,119,067 | 1/1964 | Wohlenberg | 325—477 |
| 3,299,359 | 1/1967 | Court | 325—431 |

RALPH D. BLAKESLEE, Primary Examiner

U.S. Cl. X.R.

325—49